United States Patent [19]
Bates et al.

[11] Patent Number: 5,872,566
[45] Date of Patent: Feb. 16, 1999

[54] GRAPHICAL USER INTERFACE METHOD AND SYSTEM THAT PROVIDES AN INERTIAL SLIDER WITHIN A SCROLL BAR

[75] Inventors: Cary L. Bates; Paul R. Day, both of Rochester, Minn.

[73] Assignee: International Business Machines Corporation, Armonk, N.Y.

[21] Appl. No.: 804,460

[22] Filed: Feb. 21, 1997

[51] Int. Cl.[6] .............................. G06F 3/14; G06F 3/00
[52] U.S. Cl. .................... 345/341; 345/974; 345/973; 345/145; 345/349
[58] Field of Search .................. 345/341, 973, 345/123, 974, 340, 339, 145, 163, 349

[56] References Cited

U.S. PATENT DOCUMENTS

| | | | |
|---|---|---|---|
| 5,075,673 | 12/1991 | Yanker ................................ | 345/163 |
| 5,122,785 | 6/1992 | Cooper ............................... | 345/163 |
| 5,196,838 | 3/1993 | Meier et al. ....................... | 345/341 X |
| 5,202,961 | 4/1993 | Mills et al. ........................ | 345/145 X |
| 5,313,229 | 5/1994 | Gilligan et al. ................... | 345/123 X |
| 5,371,846 | 12/1994 | Bates .................................. | 345/341 |
| 5,374,942 | 12/1994 | Gilligan et al. ................... | 345/123 X |
| 5,473,344 | 12/1995 | Bacon et al. ...................... | 345/163 |
| 5,495,566 | 2/1996 | Kwatinetz ......................... | 345/341 |
| 5,526,480 | 6/1996 | Gibson ............................... | 345/341 X |
| 5,528,260 | 6/1996 | Kent ................................... | 345/123 |
| 5,530,455 | 6/1996 | Gillick et al. ..................... | 345/123 X |
| 5,633,657 | 5/1997 | Falcón ................................ | 345/145 |

OTHER PUBLICATIONS

"Delrina 7.0 WinFax Pro Getting Started Guide, Getting Started Basics", Apr. 1996, pp. 5–11.

IBM Technical Disclosure Bulletin, vol. 37, No. 08, Aug. 1994, "New Common User Access Control: Pushpad for Greater Mouse Productivity," pp. 497–499.

IBM Technical Disclosure Bulletin, vol. 38, No. 01, Jan. 1995, "Speed–Sensitive Scroll Widgets," pp. 483–484.

*Primary Examiner*—Raymond J. Bayerl
*Attorney, Agent, or Firm*—Andrew J. Dillon

[57] ABSTRACT

A method and system for use with a graphical user interface having a cursor, scroll bar, and slider provide consistent granularity in scrolling through various differently sized viewable objects displayed within a window of a graphical user interface. The method and system achieves the forgoing by (1) calculating a movement parameter dependent upon the length of a viewable object; and (2) scrolling through the viewable object at a rate dependent upon the calculated movement parameter, in response to user input.

23 Claims, 8 Drawing Sheets

GRAPHICAL USER INTERFACE METHOD AND SYSTEM THAT PROVIDES AN INERTIAL SLIDER WITHIN A SCROLL BAR

BACKGROUND OF THE INVENTION

1. Technical Field

The present invention relates, in general, to an improved graphical user interface method and system. In particular, the present invention relates to an improved graphical user interface method and system having a cursor, scroll bar, and slider.

2. Background

A graphical user interface is a type of display format that enables a user to choose commands, start programs, and see lists of files and other options by pointing to pictorial representations and lists of menu items on a computer display screen. Choices can generally be activated by either a keyboard or a pointing device such as a mouse. A mouse is a commonly used pointing device, containing one or more buttons, that allows a user to interact with a product or operating environment such as a graphical user interface.

For application developers, a graphical user interface offers an environment that can handle direct interaction with the computer. Such environments free the developer to concentrate on a given application without becoming entangled in the details of a screen display or mouse and keyboard input. A graphical user interface also enables programmers to create programs to handle frequently performed tasks, such as saving a data file. The interface itself provides standard controlling mechanisms such as windows and dialog boxes.

Some conventional graphical user interfaces provide a cursor and scroll bar for scrolling through pages of a viewable object. A viewable object can contain multiple components such as spreadsheets, text, hotlinks, pictures, sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus well-known in the art of graphical user interfaces for moving about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control movement or to scroll through lines and pages of a viewable object, while a horizontal scroll bar controls movement through words in a line.

Such conventional scroll bar systems usually comprise two arrows and a slider. Each arrow controls which direction a user desires to scroll through a viewable object. An arrow conventionally controls movement through a viewable object in small increments or small blocks of information, such as individual lines or a page of a viewable object, for example. Moreover, if an arrow points in the upward direction, the viewable object will be scrolled from its present position in the viewable object toward the first page. If an arrow points in the downward position, the viewable object will be scrolled from its present position in a viewable object toward the last page of the viewable object.

A slider is conventionally used to control movement through a viewable object in larger increments than when the arrows are used. A slider is one form of a graphical user interface icon. Instead of incrementing by small blocks of information, the slider typically controls movement through a viewable object in larger blocks, increments, or groups of information, such as two or more pages, for example. Therefore, when a user desires to go from the first page to the fiftieth page, the slider is usually selected and moved until page fifty is selected. The term "elevator" is also utilized to describe such a slider.

The foregoing noted methods (scroll bars and sliders) work when viewing relatively small viewable objects. However, when such methods are applied to relatively large viewable objects, deficiencies in the scroll bar and slider methods are noticeable.

When a very large viewable object, such as a list of items, is accessed by a user via a graphical user interface, the arrows in scroll mode generally move through the viewable object too slowly to be of significant use to the user. On the other hand, the discontinuous jumps through the viewable object that occur when the scroll bar is used to advance at a rate of, for example, a page at a time do not allow the user to smoothly view and comprehend the information in the viewable object.

When a very large viewable object, such as a list of items, is accessed by a user via a graphical user interface, the scroll bar slider often represents only a very small portion of such a viewable object. When the slider is grabbed and moved by the user utilizing, for example, a mouse cursor pointer, the viewable object will scroll too quickly even for small movements of the slider, making it difficult for the user to find a particular section within the viewable object. Even expert mouse users, for instance, can become frustrated when utilizing such a slider on a large viewable object. The problem increases for less adept users who try to scroll through viewable objects such as encyclopedias, dictionaries, phone books, or other viewable objects.

Thus, when the foregoing noted methods are applied to very large viewable objects, the methods are found to be deficient in that the arrows in scroll mode are too slow to be of satisfactory use, while use of the scroll bar in discontinuous mode presents the information in a jerky, discontinuous fashion which is difficult for a user to follow, and use of the slider is found to be unsatisfactory in that it moves through the viewable object too fast to be comprehended by the user. The foregoing deficiencies become particularly noticeable when the user wants to move through the relatively large viewable object in a fashion such that a user can easily comprehend his or her current position within the viewable object. The foregoing noted deficiencies give rise to several concomitant needs.

With respect to the foregoing identified needs, the inventors are aware of no attempts to date which have been directed toward satisfying the foregoing identified needs. Thus, it is apparent that a need exists for a method and system which will allow scanning through a viewable object which smoothly and predictably transitions from a very slow rate of scrolling through the viewable object to a very rapid rate of scrolling through the viewable object.

SUMMARY

It is therefore one object of the present invention to provide an improved graphical user interface method and system.

It is therefore another object of the present invention to provide an improved graphical user interface method and system having a cursor, scroll bar, and slider.

It is yet another object of the present invention to provide an improved graphical user interface method and system having a curser, scroll bar, and slider, and which provides an "inertial" slider, with such "inertia" dependent upon both user input and viewable object length, which in response to "force" (mouse input) applied, initially scrolls very slowly through a viewable object and then subsequently "accelerates" to higher scrolling "velocities," dependent upon the "force" (mouse input) applied to the "inertial" slider.

The foregoing objects are achieved as is now described. Provided is an improved method and system for use with a graphical user interface having a cursor, scroll bar, and slider. The method and system provide consistent granularity in scrolling through various differently sized viewable objects displayed within a window of a graphical user interface. The method and system achieves the forgoing by (1) calculating a movement parameter dependent upon the length of a viewable object; and (2) scrolling through the viewable object at a rate dependent upon the calculated movement parameter, in response to user input.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION

The inventors have determined that a way to satisfy the foregoing referenced needs and problems is to create a slider, which appears as an icon within the graphical user interface, and which has characteristics similar to a physical object with "mass," and hence "inertia." The inventors have designed their method and system such that the "mass" of a slider is calculated dependent upon both the size of the viewable object and the minimal mouse movement that a user of the system finds comfortable. The relation of the calculated "mass" to the size of a viewable object is that a viewable object of relatively small size will yield a slider of relatively smaller calculated "mass" while a relatively larger viewable object will yield a slider with relatively larger calculated "mass." The inventors also associate mouse movement with a "force" which is applied to a slider with a certain calculated "mass."

When a slider with a certain calculated "mass" is initially at rest, it resists being moved by any "force" (mouse movement input) applied to it. Consequently, dependent upon the magnitude of the "force" applied to the slider, the slider of calculated "mass" tends to accelerate dependent upon both its "mass" and the "force" applied to it. As will be discussed below, both the "mass" and the "force" characteristics are adjusted dependent upon the size of the viewable object and user supplied input. When the user attempts to manipulate the slider to scroll through the viewable object, the rate of scrolling ("velocity") of the slider is initially very slow and subsequently increases to the maximum rate of scrolling ("terminal velocity").

It should be noted that the "mass," "inertia," "force," and "velocity" characteristics are used to control the initial and subsequent motions of the slider, and hence scrolling. Should the user cease to provide mouse inputs, the use of such characteristics are dropped; that is, the characteristics are used insofar as they relate to an object at rest remaining at rest until acted upon by some outside force, but the characteristics that apply to a physical object in motion remaining in motion until acted upon by some outside force are not used. Instead, when the "force" (mouse input) ceases to be applied, the slider immediately stops, or resumes the at rest state.

How the inventors implement the foregoing will now be discussed in the following figures.

Figure 1:
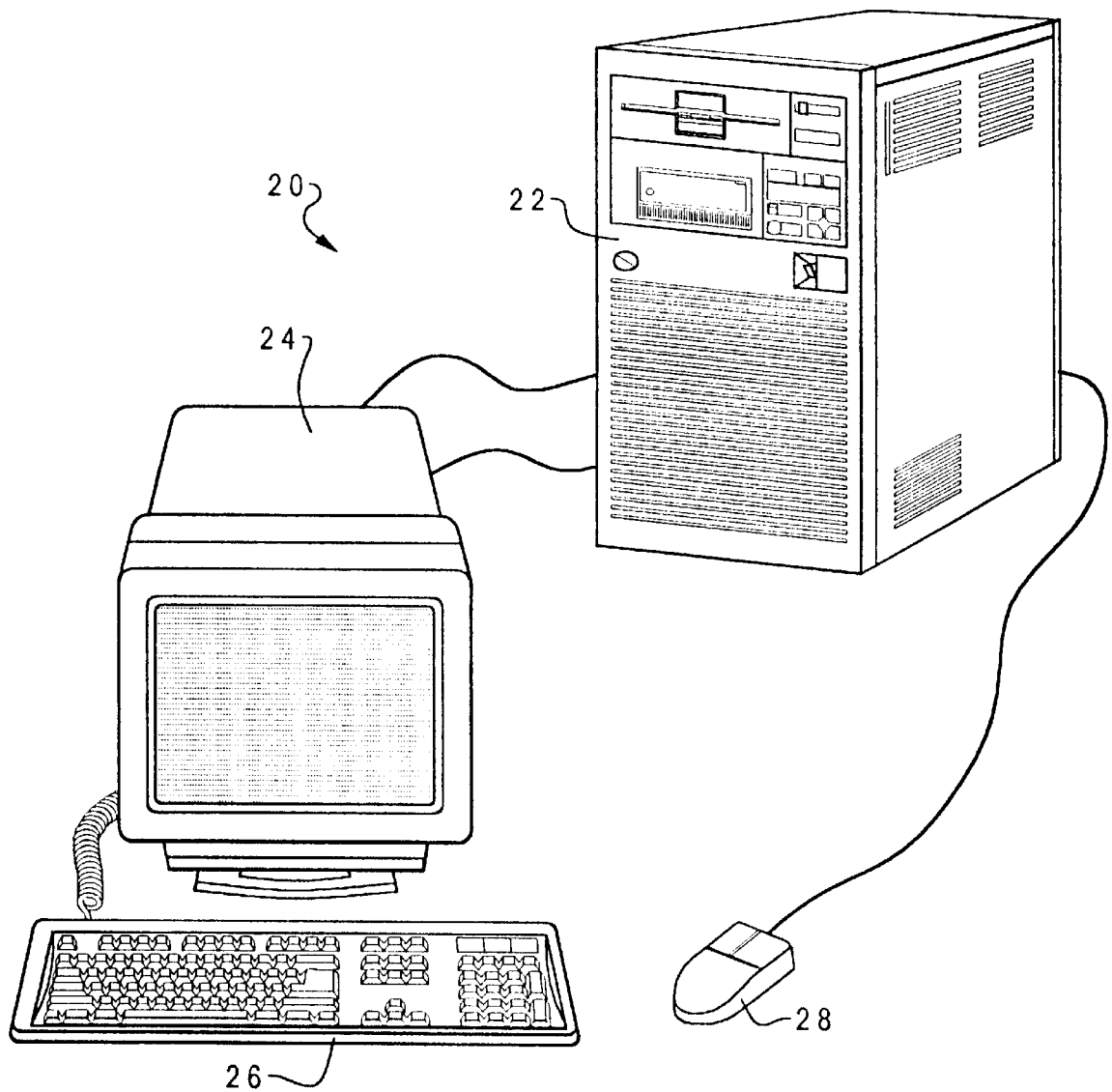
FIG. 1 depicts a pictorial representation of a data-processing system which can be utilized in accordance with the method and system of an illustrative embodiment of the present invention.

With reference now to the figures and in particular with reference now to FIG. 1, there is depicted a pictorial representation of a data-processing system which can be utilized in accordance with the method and system of an illustrative embodiment of the present invention. The graphical user interface system and method provided by an illustrative embodiment of the present invention can be implemented with the data-processing system depicted in FIG. 1. A computer 20 is depicted which includes a system unit 22, a video display terminal 24, a keyboard 26, and a mouse 28. Computer 20 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 2:
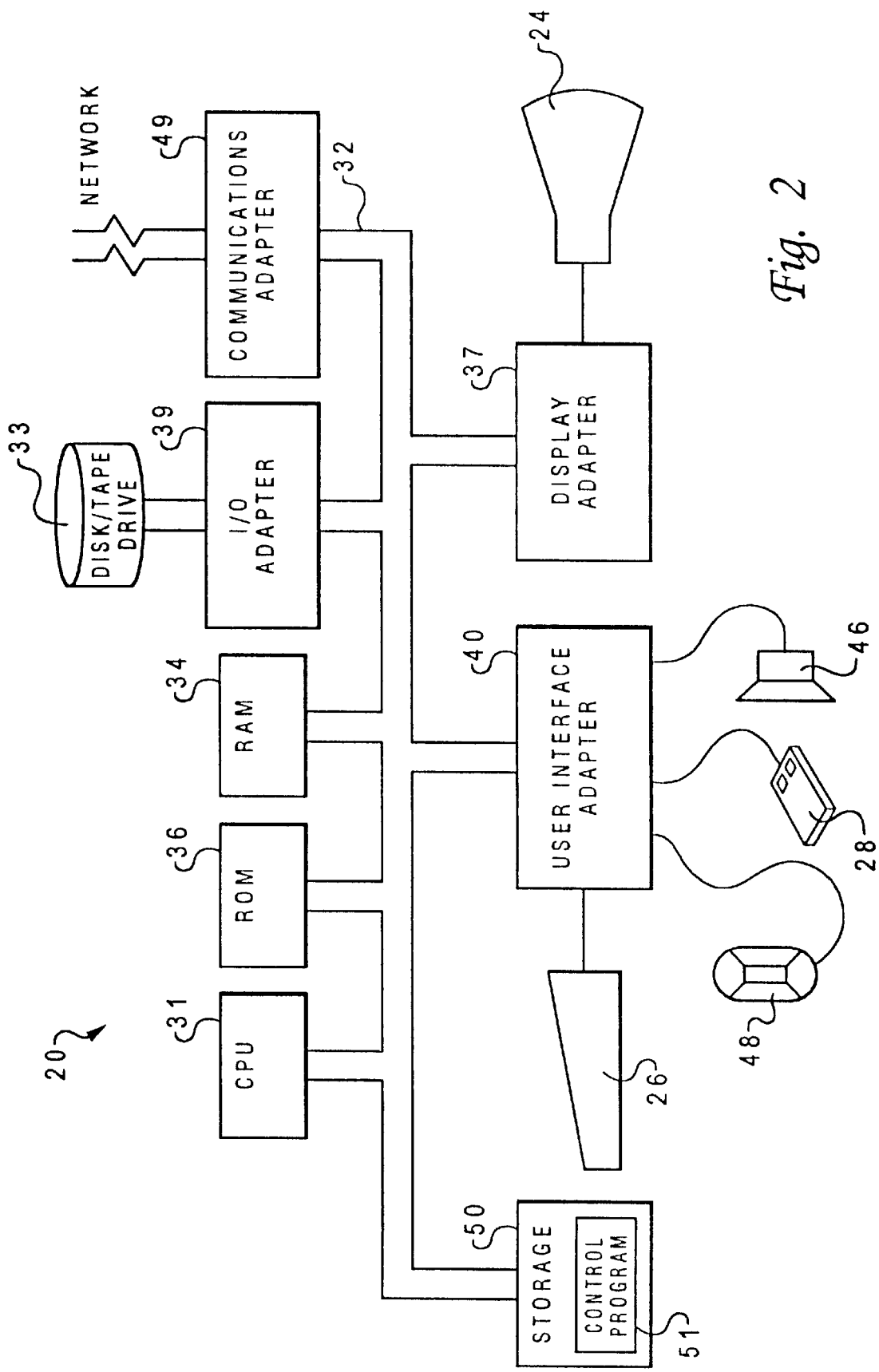
FIG. 2 is an illustration of a representative hardware environment which incorporates a graphical user interface which can be utilized in accordance with the method and system of an illustrative embodiment of the present invention.

FIG. 2 is an illustration of a representative hardware environment which incorporates a graphical user interface which can be utilized in accordance with the method and system of an illustrative embodiment of the present invention. FIG. 2 depicts selected components in computer 20 in which an illustrative embodiment of the present invention may be implemented. System unit 22 includes a Central Processing Unit ("CPU") 31, such as a conventional microprocessor, and a number of other units interconnected via system bus 32. Computer 20 includes random-access memory ("RAM") 34, read-only memory ("ROM") 36, display adapter 37 for connecting system bus 32 to video display terminal 24, and I/O adapter 39 for connecting peripheral devices (e.g., disk and tape drives 33) to system bus 32. Video display terminal 24 is the visual output of computer 20, which can be a CRT-based video display well-known in the art of computer hardware. However, with a portable or notebook-based computer, video display terminal 24 can be replaced with an LCD-based or a gas plasma-based flat-panel display. Computer 20 further includes user interface adapter 40 for connecting keyboard 26, mouse 28, speaker 46, microphone 48, and/or other user interface devices, such as a touch screen device (not shown), to system bus 32. Communications adapter 49 connects computer 20 to a data-processing network.

Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 31, such as touch-screen technology or human voice control. In addition, computer 20 includes a control program 51 which resides within computer storage 50. Control program 51 contains instructions that when executed on CPU 31 carries out the operations depicted in the logic flowchart of FIG. 4 described herein.

Those skilled in the art will appreciate that the hardware depicted in FIG. 2 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final preliminary matter, it is important that while an illustrative embodiment of the present invention has been, and will continue to be, described in the context of a fully functional computing system, those skilled in the art will appreciate that the mechanisms of the present invention are capable of being distributed as a program product in a variety of forms, and that an illustrative embodiment of the present invention applies equally regardless of the particular type of signal bearing media used to actually carry out the distribution. Examples of signal bearing media include: recordable type media such as floppy disks, hard disk drives, CD ROMs, and transmission type media such as digital and analogue communication links.

Figure 3:
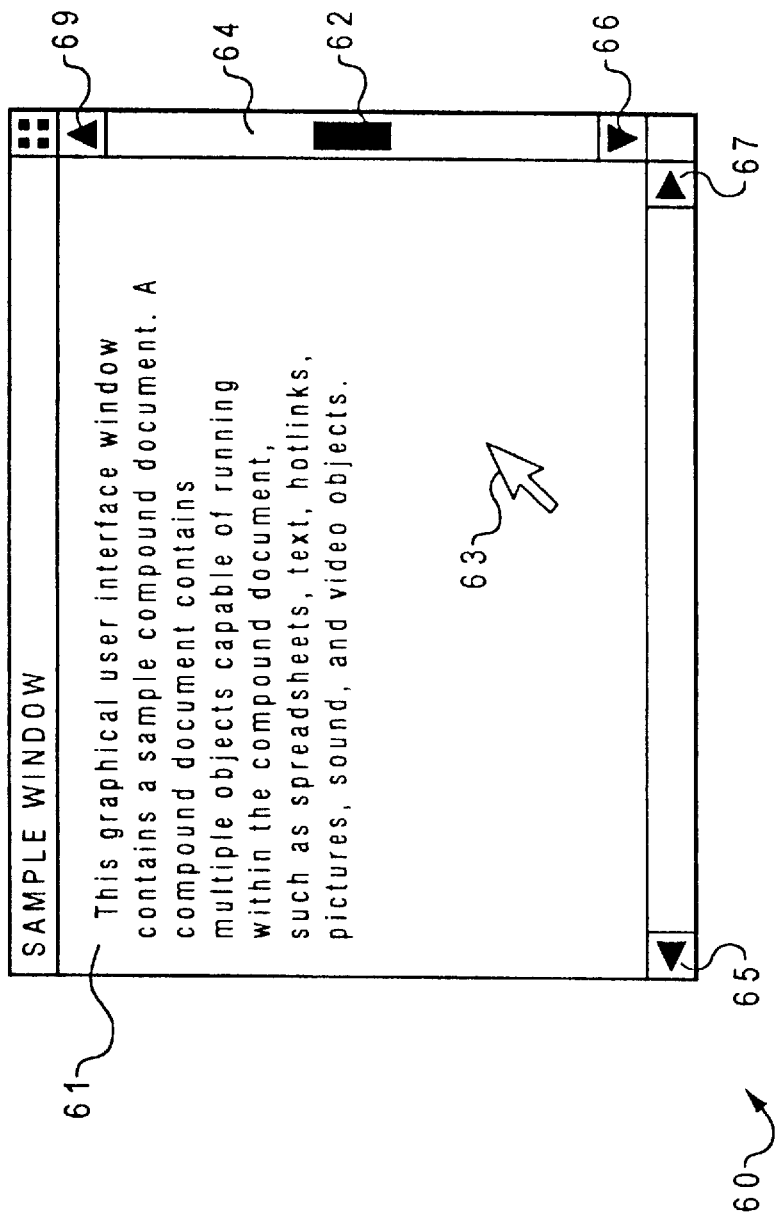
FIG. 3 depicts a pictorial representation of a graphical user interface window which can be utilized in accordance with the method and system of an illustrative embodiment of the present invention.
Figure 8:
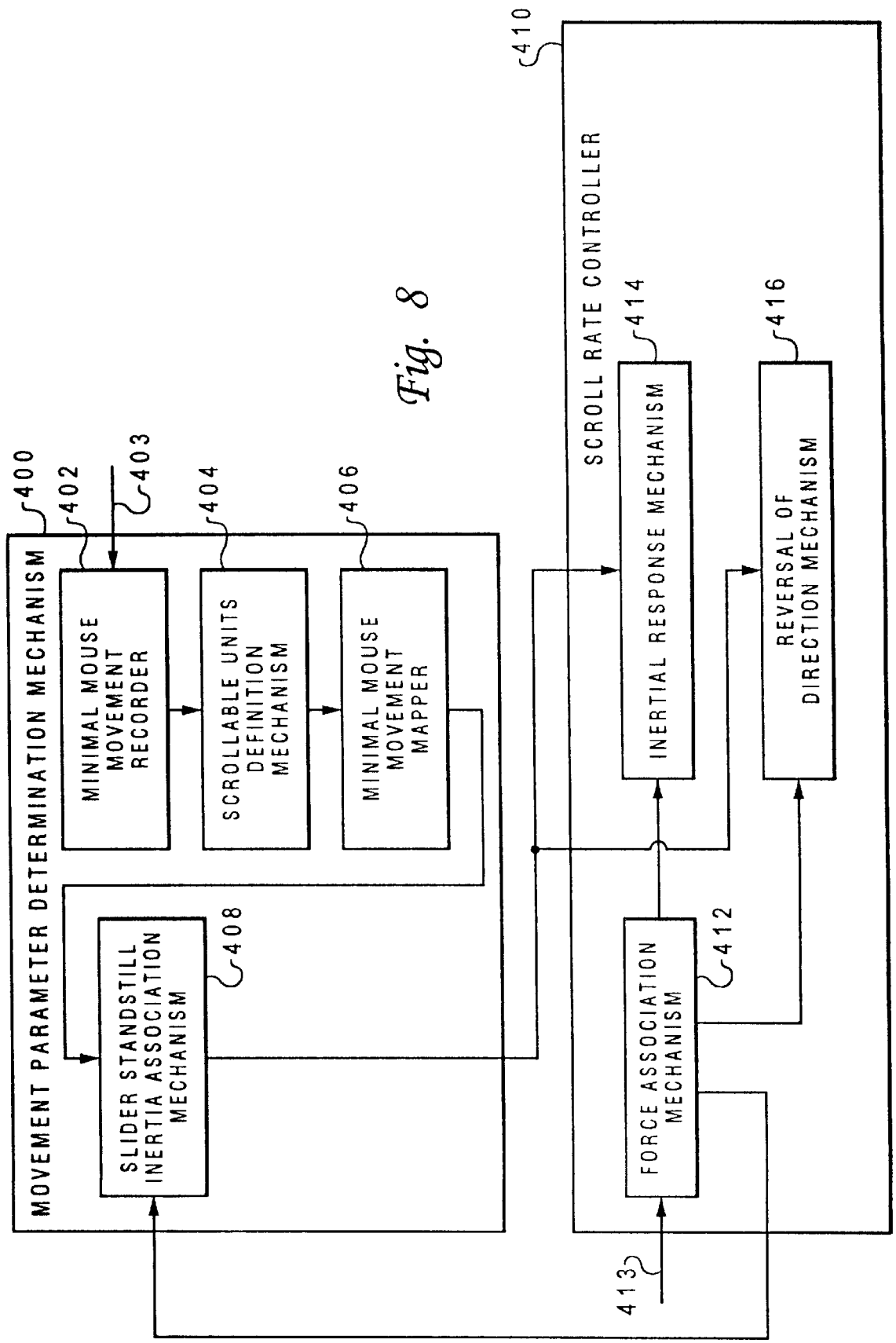
FIG. 8 is a schematic diagram of a system for implementing an illustrative embodiment of the present invention.

In FIG. 3, and FIG. 8, like parts are indicated by like numbers. FIG. 3 depicts a pictorial representation of a graphical user interface window 60 which may be utilized in accordance with the method and system of an illustrative embodiment of the present invention. Window 60 displays a portion of a viewable object 61. Viewable object 61 can contain multiple components capable of running within the viewable object, such as spreadsheets, text, hotlinks, pictures, sound, and video objects. However, those skilled in the art will appreciate that viewable objects are not limited to these types of components. The size and position of slider 62 within scroll bar 64 corresponds to the size and position of the current viewable page in relation to viewable object 61. The current viewable page is contained within a viewable window area within window 60.

Because viewable object 61 includes too many pages to view simultaneously, the user can position a mouse cursor 63 over up-arrow 69 or down-arrow section 66 of scroll bar 64 and click a pointing device (e.g., a mouse) to scroll the viewable object upward or downward, as appropriate. Scrolling in this manner permits viewing of any desired portion of viewable object 61. Scrolling is the electronic equivalent of reading through a rolled (i.e., "scrolled") viewable object rather than flipping through pages of a book. Arrows 65 and 67 can also be utilized by a graphical user interface user to scroll left or right through viewable object 61. Scroll bar 64 is thus a graphical user interface window component, associated with a scrollable area, that indicates to a user that more information is available or can be added in a particular direction and can be scrolled into view.

In FIG. 3, the graphical user interface utilized in accordance with the method and system of an illustrative embodiment of the present invention sizes slider 62 within scroll bar 64 according to the number of pages in viewable object 61. The length of slider 62 is small with respect to the length of scroll bar 64 because it represents one of many pages of viewable object 61. Similarly, the graphical user interface positions slider 62 within scroll bar 64 relative to the viewable position of the viewable object. For example, the graphical user interface positions slider 62 at the top of scroll bar 64 when the user is viewing the first page of viewable object 61, and at the bottom of scroll bar 64 when the user is viewing the last page of viewable object 61. Slider 62 on scroll bar 64 is defined to have a minimum size.

Figure 4:
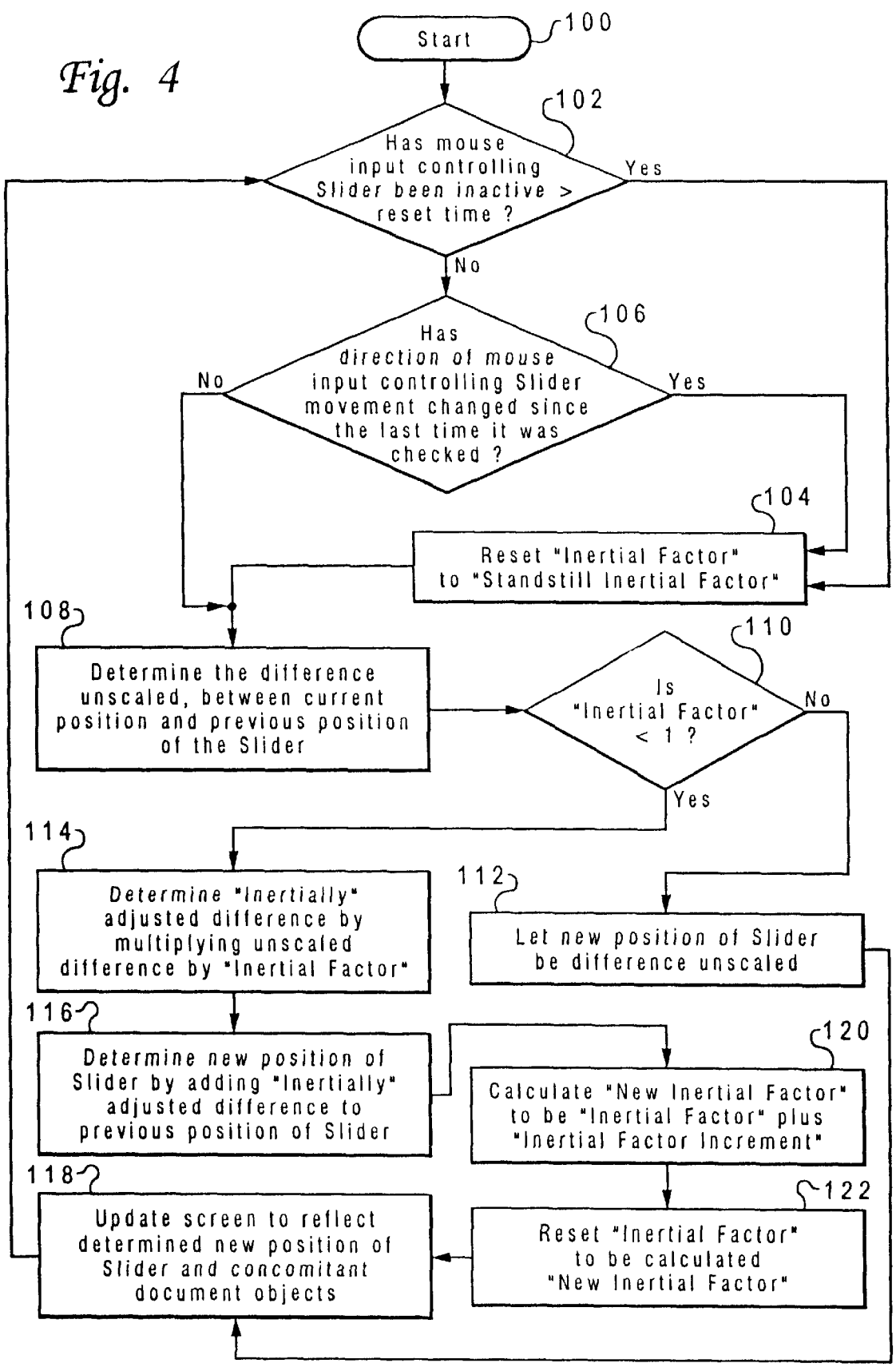
FIG. 4 is a high level logic flowchart which depicts how the "inertial" slider method and process functions.
Figure 5:
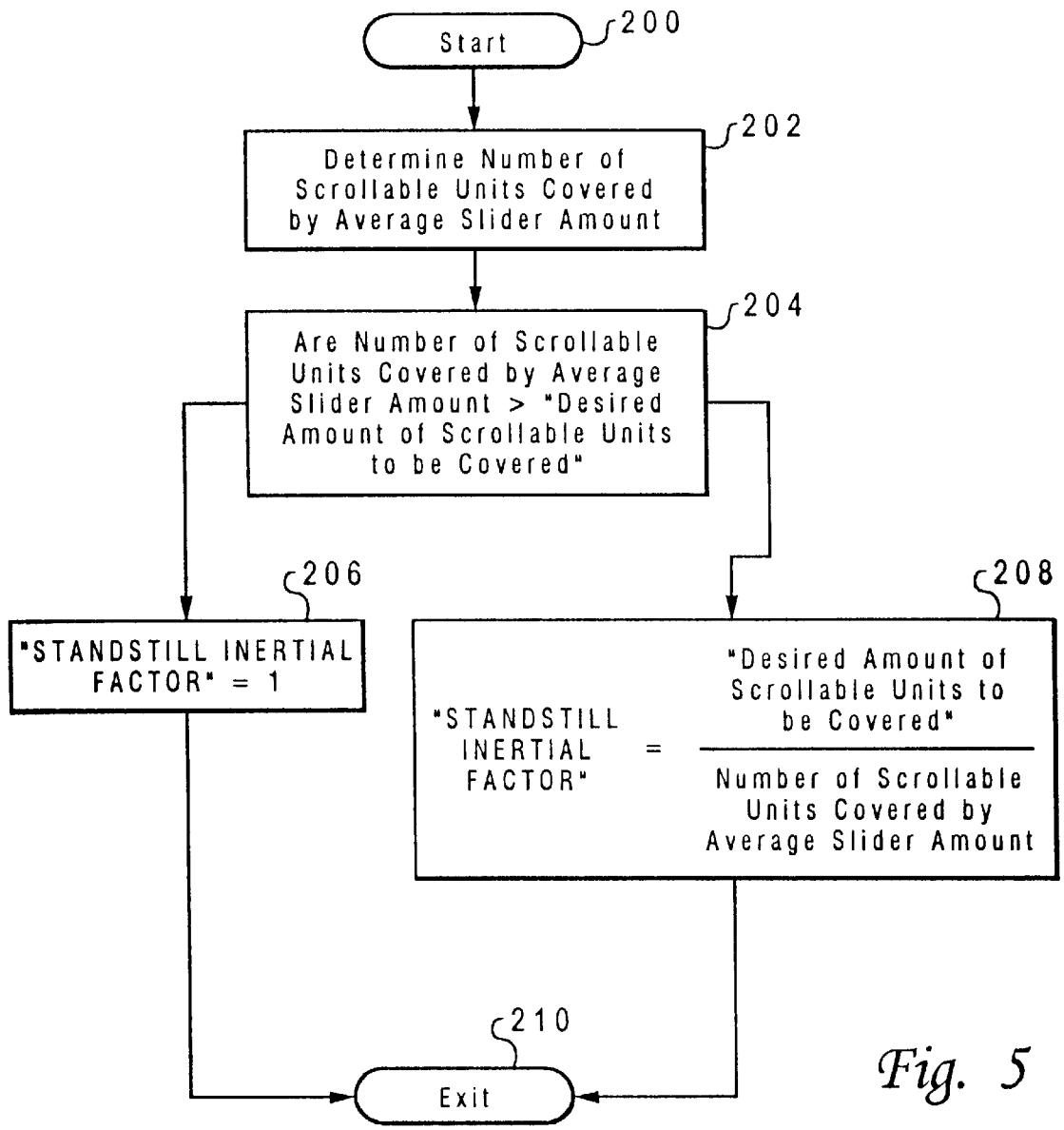
FIG. 5 is a high level logic flowchart which depicts how quantities referenced in FIG. 4 are obtained.
Figure 6:
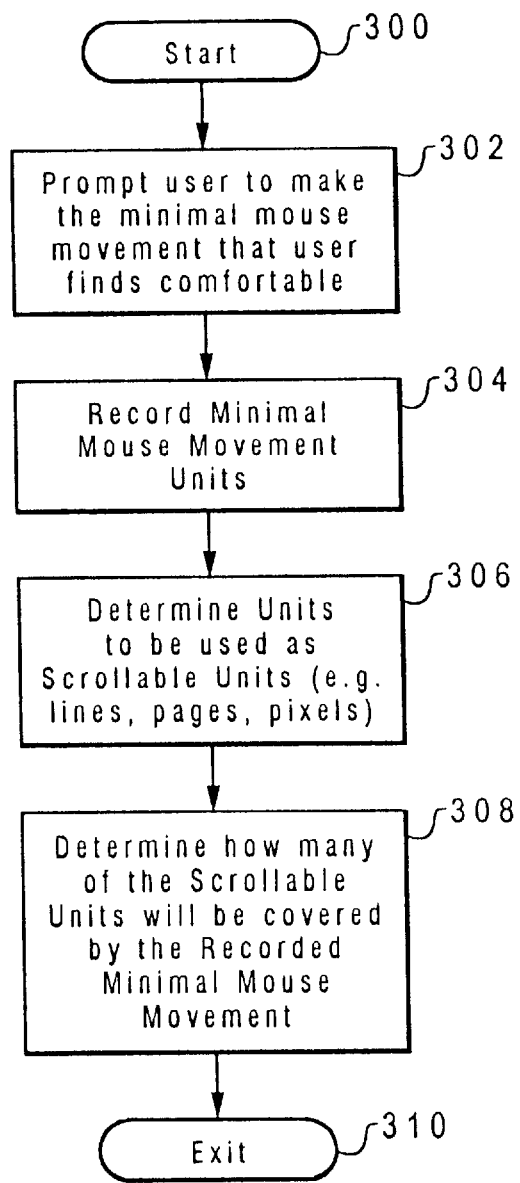
FIG. 6 is a high level logic flowchart which depicts how quantities referenced in FIG. 4 are obtained.

FIG. 4, FIG. 5, and FIG. 6, are high level logic flowcharts depicting the method and process whereby the "inertial" slider is implemented. FIG. 4 is a high-level logic flowchart which depicts how the "inertial" slider method and process functions. FIG. 5 and FIG. 6 are high-level logic flowcharts which depicts how quantities referenced in FIG. 4 are obtained.

Refer now to FIG. 4, which is a high-level logic flowchart which depicts the method and process of an illustrative embodiment of the present invention. Method step 100 shows the start of the process. Method step 102 illustrates that if the mouse input that controls the slider has been inactive for greater than a prespecified amount of time (with such prespecified amount of time typically being in the microsecond range), then the method proceeds to method step 104 where the "inertial factor" of the slider is reset to "standstill inertial factor." The "inertial factor" is a parameter used to simulate the tendency of a slider with "mass" to remain at rest; how it is used to simulate this tendency will become apparent below.

Method step 102 further illustrates that if the mouse input that controls the slider has not been inactive for greater than a prespecified amount of time, then the method proceeds to method step 106. Since at this point it is known that the slider is being acted upon a "force" corresponding to an active mouse input, the next question is whether the "force" is in the direction of slider motion or opposite the direction of slider motion. Accordingly, method step 106 shows that a determination is made as to whether the direction of mouse input corresponding to the "force" to which the slider is being subjected has changed since the last time that the direction was checked, which corresponds to a change in direction of the force being applied to the slider. The determination of method step 106 is done because the "inertial factor" which, as will be seen below, controls the "velocity" of the "inertial" slider must correspondingly be adjusted such that the "velocity" at which the slider is moving is consistent with the duration and direction of the "force" to which it is being subjected. Toward this end method step 106 depicts asking if the direction of mouse input meant to direct the slider movement is different from the last time it was checked; restated, method step 106 depicts the inquiry of whether or not the mouse input controlling the slider has reversed direction. If the mouse input controlling the slider has not reversed direction since the last time the direction of movement was checked, then it is known that "force" is continuing to be applied to the slider in the same direction as the last time the direction of the force was checked, and the method proceeds to method step 108. However, method step 106 shows that if the mouse input controlling the slider has reversed direction then it is assumed that the user has "overrun" the data for which he was looking in the viewable object, and consequently the method proceeds to method step 104 wherein the slider "inertial factor" is reset to "standstill inertial factor" (this is one reason why it is stated that the slider's characteristics are similar to mass and inertia rather than identical with such concepts in that here these characteristics of the slider cease to be used in that the slider does not require time to "decelerate," but rather stops) which will have the practical effect of stopping the slider motion on the screen and then allowing it to "accelerate" in the new, opposite, direction commensurate with the slider "mass" (indicated by the "inertial factor") and the "force" (mouse input) being applied to the slider. Subsequent to this step the method proceeds to step 108.

Method step 108 shows the determination of the difference, unscaled, between the current position and the previous position of the slider. What the unscaled difference is amounts to how far the slider normally moves under the influence of the mouse input when that slider movement is unaffected by the "inertial factor."

Method step 110 illustrates determining whether the "inertial factor" is less than the number one. An "inertial factor" equal to the number one equates to the slider scrolling as fast as is possible through the viewable object as is allowed by the system. This is another point at which the "mass-inertia" characteristics are not used in their pure form, since the slider does not accelerate to an infinitely high velocity but instead reaches sort of a "terminal velocity" which is dictated by the system and application with which the method is being used. Accordingly, method step 110 indicates that if the "inertial factor" is equal to one, then the method proceeds to method step 112 wherein the "new position of slider" parameter is set equal to the previous position of the slider plus the difference, unscaled, which was determined in method step 108; another way of saying this is that the new position of slider will be at its dragged position. Subsequently, the method proceeds to method step 118.

Method step 110 illustrates that if it is determined that the "inertial factor" is less than the number one, then method step 114 depicts a determination of an "inertially adjusted" difference which is calculated by multiplying the unscaled difference of method step 110 by the "inertial factor." Subsequent to this, method step 116 illustrates that the "new position of slider" parameter is set equal to the "inertially adjusted" difference plus the previous position of the slider, and the method subsequently proceeds to method step 120.

The method proceeds to method step 120 where a "new inertial factor" is calculated to be "inertial factor" plus an "inertial factor increment." The "inertial factor increment" a quantity that relates to the "inertia-like" characteristic of the slider and is calculated dependent upon user input and the size of the file. The "inertial factor increment" is a parameter specifiable by the programmer (for example, the programmer could either specify a default or provide an interface wherein a user can enter a default parameter) which controls the "acceleration" of the "inertial" slider, but is not necessarily tied to the "inertia" of the slider. That is, if one desires to continue to follow a straight inertial scheme, one could set the "inertial factor increment" equal to the "standstill inertial factor" obtained in FIG. 5 (which would give a "acceleration" based on the viewable object's "inertia"). However, there are instances where such would not be advantageous, such as where the length of the viewable object forced the "standstill inertial factor" to be a very small number (which would mean that if the "inertial factor increment" were set equal to the "standstill inertial factor" it would take an unacceptable amount of time for the slider to "accelerate" to "terminal velocity"). In such instances the programmer can specify any inertial factor which will give an acceptable "acceleration" of the slider; that is, the "inertial factor increment" is a quantity which merely dictates how fast the "inertial" slider will accelerate, and can be specified by the programmer separate from and independent of the "inertia" of the slider. Method step 122 shows that after the "new inertial factor" has been calculated, the "inertial factor" is reset to be equal to the value of the "new inertial factor." Subsequent to this step the method proceeds to method step 118.

Method step 118 shows that the graphical user interface screen is updated to reflect "new position of slider" and the concomitant viewable objects associated with the slider. Thus, the foregoing shows that the "standstill inertial factor" determines how quickly the slider will accelerate under the influence of "force" (mouse input) being applied to it by determining how quickly the "inertial factor" will hit the "terminal velocity'" value of the number one. This can be seen clearly by tracing the flowchart of FIG. 4 through a few loops.

With reference now to FIG. 5, there is depicted a high-level logic flowchart that shows how the "standstill inertial factor" is obtained. In an illustrative embodiment, it is envisioned that the "standstill inertial factor" will be obtained every time the viewable object changes size. Method step 200 shows the start of the process. Method step 202 depicts the determination of the "number of scrollable units (which can be any of a number of quantities, such as pixels, lines, pages, etc.) covered by an 'average minimum slider amount'" (an "average minimum slider amount" is a quantity which effectuates the "mass-like" characteristics with respect to the slider and is a quantity calculated dependent upon user input and the application with which the present method and process will be used, as will be shown in FIG. 6). Method step 204 illustrates determining whether the "number of scrollable units covered by the 'average minimum slider amount'" referenced in method step 202 is greater than some prespecified desired amount of "scrollable units to be covered." The prespecified amount of "scrollable units to be covered" by an "average minimum slider amount" is a setable parameter which dictates the minimum scrolling with which the "average minimum slider amount" will be associated. "Scrollable units to be covered" could be, for example, 10 pixels, ½ line, 1 line, etc.

If method step 204 indicates that the scrollable units covered by an average slider amount are less than or equal to the prespecified "desired amount of scrollable units to be covered" then the method proceeds to method step 206, where the "standstill inertial factor" is set to the number one. If method step 204 indicates that the "number of scrollable units covered by an 'average minimum slider amount'" are greater than the prespecified amount of "scrollable units to be covered" by the "average minimum slider amount," then the method proceeds to method step 208 where the "standstill inertial factor" is set equal to the prespecified amount of "scrollable units to be covered" divided by the "number of scrollable units covered by the 'average minimum slider amount'". (The utility of this calculated "standstill inertial factor" quantity thus becomes apparent when one realizes that multiplying the quantity by the "number of scrollable units covered by the 'average minimum slider amount'" will in fact yield the desired amount of "scrollable units to be covered".) Subsequent to the foregoing, the process exits at method step 210 and deposits the value of the "standstill inertial factor" to a memory location which is known and can be used by the process shown in FIG. 4.

To make the foregoing abstract discussion more clear, assume for sake of example that method step 202 determined that "scrollable units" have been specified to be lines, and that method step 202 has determined that 147 lines are the "number of scrollable units covered by the 'average minimum slider amount'". Further assume that the prespecified amount of "scrollable units to be covered" has been set to 3 lines. Accordingly, in this example the "standstill inertial factor" would be set to 3 lines/147 lines which would yield an "standstill inertial factor" of 0.02. Thus, upon exit this value would be deposited to a memory location that is known and can be used by the process shown in FIG. 4.

Refer now to FIG. 6, which is a high-level logic flowchart which depicts the method and process whereby the "number of scrollable units covered by the 'average minimum slider amount'" referenced in FIG. 5 is determined. In an illustrative embodiment, it is envisioned that the "number of scrollable units covered by the 'average minimum slider amount'" will be obtained infrequently, such as when the program using the method and process of an illustrative embodiment of the present invention initializes, or if even more infrequency is desired, the "number of scrollable units covered by the 'average minimum slider amount'" could be a quantity obtained via a specific icon associated with it in a graphical user interface control panel. Method step 300 shows the start of the process. Method step 302 depicts determining the minimal mouse movement that a user will find comfortable. Two nonexclusive ways in which this parameter can be determined are either by prompting the human user for this quantity and making such minimal user input the default for this quantity (such as displaying a scroll bar and having the user move the slider within the scroll bar a minimal amount that the user feels comfortable with), or by empirically examining a large number of human users to determine the average minimal mouse movement that a user finds to be comfortable. Method step 304 illustrates recording the minimal mouse movement that human users(s) find comfortable as was determined in method step 302. Method step 306 depicts the determination of the units to be used as "scrollable units." These units are a specifiable parameter and can be virtually anything that serves to mark movement within the viewable object, such as pixels, lines, or pages.

Method step 308 depicts the determination of how many scrollable units will be covered by the determined minimal mouse movement that the user finds comfortable. It is at this point that the "mass-like" characteristic of the slider becomes apparent in that the determination of the scrollable units to be covered by the determined minimal mouse movements will involve the length of the viewable object, which will be used to achieve the "mass-like" characteristics.

Figure 7:
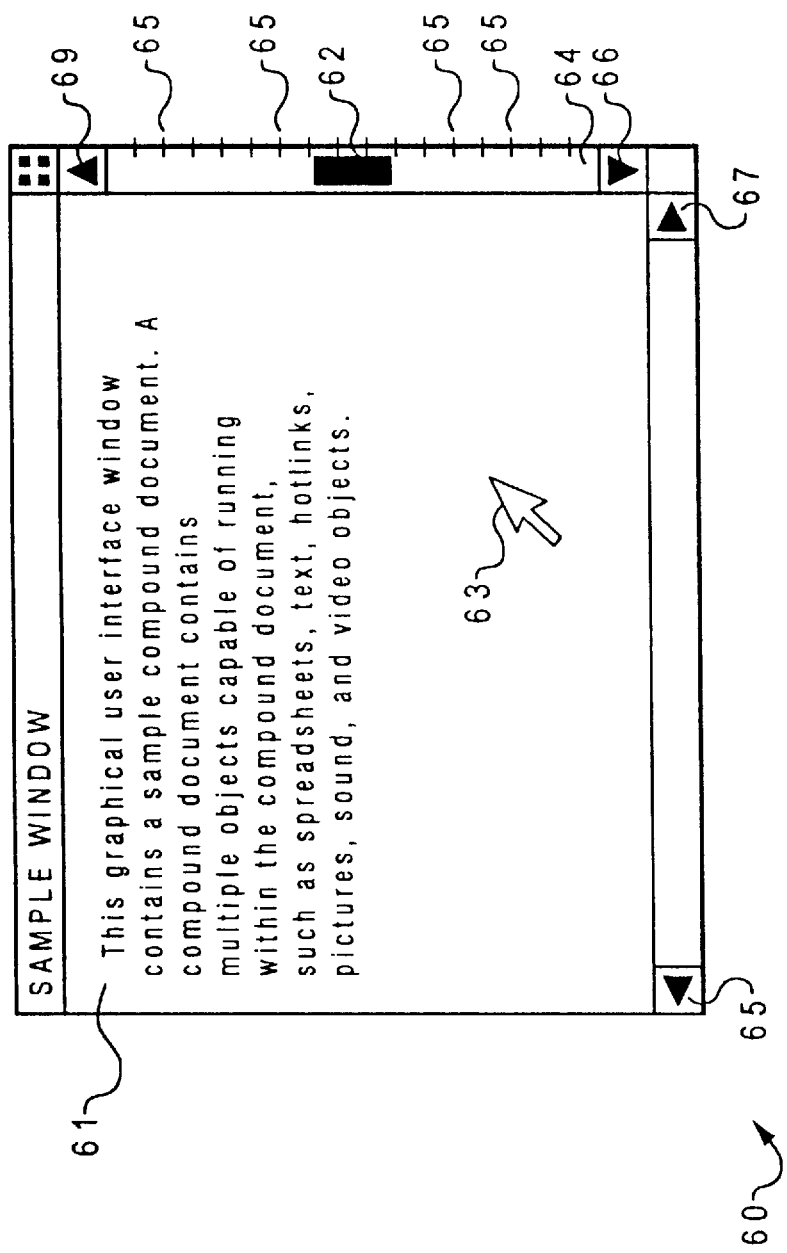
FIG. 7 is a partially schematic diagram which makes clear how the determination is made as to how many scrollable units are covered by the minimal mouse movement that users find comfortable.

Method step 308 can best be understood by reference to FIG. 7. FIG. 7 is a partially schematic diagram which makes clear the operations of method step 308. FIG. 7 depicts a pictorial view of a graphical user interface window 60 which may be utilized to implement the method and system of an illustrative embodiment of the present invention. Window 60 displays a portion of a viewable object 61. Viewable object 61 contains multiple objects capable of running within the viewable object, such as spreadsheets, text, hotlinks, pictures, sound, and video objects. The size and position of slider 62 within scroll bar 64 corresponds to the size and position of the current viewable page in relation to viewable object 61. The current viewable page is contained within a viewable window area within window 60.

As stated, the size and position of slider 62 within scroll bar 64 corresponds to the size and position of the current viewable page in relation to viewable object 61. In order to make this concept more clear, tick marks 65 have been drawn along the right hand margin of the scroll bar 64. As has been stated, scroll bar 64 is a visual representation of the entire length of the viewable object 61. Thus, each tick mark 65 will amount to a certain number of scrollable units (e.g., pixels, lines, or pages) within the viewable object. For example, assume that the viewable object being shown in FIG. 6 is twenty five pages in length. Thus, since there are seventeen tick marks 65 shown, each tick mark 65 would correspond to 25 pages/17 tick marks, or 1.471 pages/tick mark. Accordingly, when slider 62 is "grabbed" and "dragged" by use of a positioning a mouse cursor 63 over the slider 62, clicking the mouse, and then moving the mouse, each time the leading edge of the slider passes a tick mark 65 the graphical user interface will be updated to show a new position within the viewable object 1.471 pages away from the previous position shown within the graphical user interface.

At this point the functioning of method step 308 can be understood. Method step 308 determines how may scrollable units the minimal mouse movement that the user finds comfortable will advance the viewable object. That is, in method step 308 it is determined how many "scrollable units" that the minimal mouse movement that a user finds comfortable will cover. This is determined by calculating how many tick marks 65 will be covered by the minimal mouse movement that a user finds comfortable. Once this has been determined, the length of the viewable object will be utilized to determine how many of the specified "scrollable units" will be covered by the minimal mouse movements. For example, if in the above example a minimal mouse movement that a user finds comfortable equates to 2 tick marks, such a minimal movement would yield the result that the number of pages covered by such minimal movement would be 2.94 pages (2 tick marks×1.471 pages/tick mark). Assuming for sake of illustration that the "scrollable units" specified are lines, and that there are 50 lines/page, then method step 308 would yield the result that the "number of scrollable units covered by the 'average minimum slider amount'" would be (2.94 pages×50 lines/page) 147 lines. Consequently, when the method exits at method step 310, the value of 147 lines would be delivered to method step 202 in FIG. 5.

Refer now to FIG. 8 which is a schematic diagram of a system for implementing an illustrative embodiment of the present invention. The system shown in FIG. 8 consists of mechanisms shown. These mechanisms will reside in computer memory and be executed within a computing system. Shown is movement parameter determination mechanism 400. Movement parameter determination mechanism 400 determines the movement parameter which ultimately will control the rate at which scrolling takes place within a viewable object.

Movement parameter determination mechanism 400 is shown having multiple sub-components. These sub-components are and function as follows. Minimal mouse movement recorder 402 essentially carries out method step 302 and 304 of FIG. 6. Minimal mouse movement recorder 402 accepts as input 403 a minimal mouse movement that a user finds comfortable or some programmer specified minimal mouse input that a sample of users have found to be comfortable. This information is passed to scrollable units definition mechanism 404, which essentially carries out method step 306 of FIG. 6. Scrollable units definition mechanism 404 then passes the minimal mouse movement recorded and the scrollable units being used to minimal mouse movement mapper 406, which essentially carries out method step 308, in that it makes a determination as to how many of the defined scrollable units will be covered by the recorded minimal mouse movement. Once this determination has been made, this information is delivered to slider standstill inertia association mechanism 408. Upon receipt of the information from minimal mouse movement mapper 406, slider standstill inertia association mechanism 408 essentially carries out method steps 200 through 210 of FIG. 5. That is, slider standstill inertia association mechanism 408 essentially contains an inertial calculation mechanism capable of calculating an inertia dependant upon both user input and viewable object length. Upon completion of its function slider standstill inertia association mechanism 408 passes the standstill inertial factor as referenced within FIG. 5 to scroll rate controller 410.

Scroll rate controller 410 is shown having multiple sub-components. These sub-components are and functions as follows. Scroll rate controller 410 essentially carries out the process shown in FIG. 4. Force association mechanism 412 essentially carries out method steps 100, 102 and 106 in that it accepts mouse input 413 and determines whether that mouse input has been inactive for a certain amount of time, and if it has been inactive force association mechanism 412 delivers a signal to slider standstill inertia association mechanism 408, which then calculates a new standstill inertial factor and delivers such to inertial response mechanism 414. Inertial response mechanism 414 essentially performs the loops embodied in method steps 108 through 122 followed by the loop components embodied by method step 102 followed by method step 106 followed by method step 108 of FIG. 6. That is, inertial response mechanism 414 insures that if mouse input is maintained that the slider will initially appear within the graphical user interface to move dependent upon the standstill inertial factor and then increase at a rate determined by the inertial factor increment as described in FIG. 4 and the speed at which the loop described in FIG. 4 is implemented.

In the event that force association mechanism 412 detects that the mouse input controlling the slider has changed direction force association mechanism 412 delivers that information to reversal of direction mechanism 416. Reversal of direction mechanism 416 essentially carries out the loop consisting of method step 102 proceeding to method step 106 proceeding to method step 104 wherein as is shown in FIG. 4 the inertial factor is reset to the standstill inertial factor. Once this is done reversal of direction mechanism 416 essentially engages in carrying out the functions embodied within the loops embodied within method steps 108 through 122 and method step 102 followed by method step 106 followed by method step 108. That is, reversal of direction mechanism 416, after insuring that the motion of the slider is reset to be dependent upon the standstill inertial factor then allows the slider to accelerate in the manner dictated by the foregoing method steps of FIG. 4.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method for scrolling through various differently sized viewable objects, said method to be utilized with an interface having a slider, and said method comprising the steps of:

calculating a movement parameter dependent upon the length of a viewable object by associating an inertia with a slider, wherein said inertia is dependent upon said viewable object length; and scrolling through said viewable object at a rate dependent upon said calculated movement parameter, in response to user input.

2. The method of claim 1, wherein said step of associating with a slider an inertia further comprises calculating said inertia dependent upon both user input and viewable object length.

3. The method of claim 1, wherein said step of scrolling through said viewable object further comprises the step of scrolling through said viewable object at a rate dependent upon said inertia of said slider with said scrolling through said viewable object arising in response to a dragging of said inertial slider.

4. The method of claim 1, wherein said step of scrolling through said viewable object further comprises the steps of:

associating dragging said inertial slider with a force; and scrolling through said viewable object at a rate dependent upon said inertia of said slider and a duration of said force associated with said dragging of said inertial slider such that an initially at rest slider tends to remain at rest until acted upon by said force, and tends to accelerate dependent upon said duration of said force and said slider inertia, with said scrolling through said viewable object arising in response to dragging of said inertial slider.

5. The method of claim 4 further comprising the step of:

arresting the motion of said slider and subsequently scrolling through said viewable object in a reversed direction and at a rate dependent upon said inertia of said slider and a duration of said force associated with said dragging of said inertial slider such that said arrested slider tends to remain at rest until acted upon by said force, and then tends to accelerate dependent upon the duration of said force and said slider inertia, with said arresting the motion of said slider arising in response to a reversal of direction of said dragging of said inertial slider.

6. The method of claim 1, wherein said step of scrolling through said viewable object further comprises the steps of:

associating dragging said inertial slider with a force; and scrolling through said viewable object at a rate dependent upon said inertia of said slider, a direction of said force, and a duration of said force associated with said dragging of said inertial slider such that an initially at rest slider tends to remain at rest until acted upon by said force, and tends to accelerate dependent upon said direction and duration of said force and said slider inertia, with said scrolling through said viewable object arising in response to dragging of said inertial slider.

7. The method of claim 6 further comprising the step of:

arresting the motion of said slider and subsequently scrolling through said viewable object in a reversed direction and at a rate dependent upon said inertia of said slider, a direction of said force, and a duration of said force associated with said dragging of said inertial slider such that said arrested slider tends to remain at rest until acted upon by said force, and then tends to accelerate dependent upon the direction and duration of said force and said slider inertia, with said arresting the motion of said slider arising in response to a reversal of direction of said dragging of said inertial slider.

8. An apparatus for scrolling through various differently sized viewable objects, said apparatus to be utilized with an interface having a slider, and said apparatus comprising:

a movement parameter determination mechanism that calculates a movement parameter dependent upon the length of a viewable object, including a standstill inertia association mechanism that associates an inertia with a slider, wherein said inertia is dependent upon said viewable object length; and a scroll rate controller that scrolls through said viewable object at a rate dependent upon said calculated movement parameter, with said scroll rate controller responsive to user input.

9. The apparatus of claim 8, wherein said standstill inertia association mechanism further comprises an inertia calculation mechanism that calculates said inertia dependent upon both user input and viewable object length.

10. The apparatus of claim 8, wherein said scroll rate controller further comprises an inertial response mechanism that scrolls through said viewable object at a rate dependent upon said inertia of said slider with said inertial response mechanism that scrolls through said viewable object responsive to a dragging of said inertial slider.

11. The apparatus of claim 8, wherein said scroll rate controller further comprises:

a force association mechanism that associates dragging said inertial slider with a force; and an inertial response mechanism that scrolls through said viewable object at a rate dependent upon said inertia of said slider and a duration of said force associated with said dragging of said inertial slider such that an initially at rest slider tends to remain at rest until acted upon by said force, and tends to accelerate dependent upon said duration of said force and said slider inertia, with said inertial response mechanism that scrolls through said viewable object responsive to dragging of said inertial slider.

12. The apparatus of claim 11 further comprising:

a reversal of direction mechanism that arrests the motion of said slider and subsequently scrolls through said viewable object in a reversed direction and at a rate dependent upon said inertia of said slider and a duration of said force associated with said dragging of said inertial slider such that said arrested slider tends to remain at rest until acted upon by said force, and then tends to accelerate dependent upon the duration of said force and said slider inertia, with said reversal of direction mechanism that arrests the motion of said slider responsive to a reversal of direction of said dragging of said inertial slider.

13. The apparatus of claim 8, wherein said scroll rate controller further comprises:

a force association mechanism that associates dragging said inertial slider with a force; and an inertial response mechanism that scrolls through said viewable object at a rate dependent upon said inertia of said slider, a direction of said force, and a duration of said force associated with said dragging of said inertial slider such that an initially at rest slider tends to remain at rest until acted upon by said force, and tends to accelerate dependent upon said direction and duration of said force and said slider inertia, with said inertial response mechanism that scrolls through said viewable object responsive to dragging of said inertial slider.

14. The apparatus of claim 13 further comprising:

a reversal of direction mechanism that arrests the motion of said slider and subsequently scrolls through said viewable object in a reversed direction and at a rate dependent upon said inertia of said slider, a direction of said force, and a duration of said force associated with said dragging of said inertial slider such that said arrested slider tends to remain at rest until acted upon by said force, and then tends to accelerate dependent upon the direction and duration of said force and said slider inertia, with said reversal of direction mechanism that arrests the motion of said slider responsive to a reversal of direction of said dragging of said inertial slider.

15. A program product residing in computer memory in a data-processing system for scrolling through various differently sized viewable objects, said program product to be utilized with an interface having a slider, and said program product comprising:

a movement parameter determination mechanism that calculates a movement parameter dependent upon the length of a viewable object, including a standstill inertia association mechanism that associates an inertia with a slider, wherein said inertia is dependent upon said viewable object length; and a scroll rate controller that scrolls through said viewable object at a rate dependent upon said calculated movement parameter, with said scroll rate controller responsive to user input; and signal bearing media bearing said movement parameter determination mechanism and scroll rate controller.

16. The program product of claim 15 wherein said signal bearing media comprises recordable media.

17. The program product of claim 15 wherein said signal bearing media comprises transmission media.

18. The program product of claim 15, wherein said standstill inertia association mechanism further comprises an inertia calculation mechanism that calculates said inertia dependent upon both user input and viewable object length.

19. The program product of claim 15, wherein said scroll rate controller further comprises an inertial response mechanism that scrolls through said viewable object at a rate dependent upon said inertia of said slider with said inertial response mechanism that scrolls through said viewable object responsive to a dragging of said inertial slider.

20. The program product of claim 15, wherein said scroll rate controller further comprises:

a force association mechanism that associates dragging said inertial slider with a force; and an inertial response mechanism that scrolls through said viewable object at a rate dependent upon said inertia of said slider and a duration of said force associated with said dragging of said inertial slider such that an initially at rest slider tends to remain at rest until acted upon by said force, and tends to accelerate dependent upon said duration of said force and said slider inertia, with said inertial response mechanism that scrolls through said viewable object responsive to dragging of said inertial slider.

21. The program product of claim 20 further comprising:

a reversal of direction mechanism that arrests the motion of said slider and subsequently scrolls through said viewable object in a reversed direction and at a rate dependent upon said inertia of said slider and a duration of said force associated with said dragging of said inertial slider such that said arrested slider tends to remain at rest until acted upon by said force, and then tends to accelerate dependent upon the duration of said force and said slider inertia, with said reversal of direction mechanism that arrests the motion of said slider responsive to a reversal of direction of said dragging of said inertial slider.

22. The program product of claim 15, wherein said scroll rate controller further comprises:

a force association mechanism that associates dragging said inertial slider with a force; and an inertial response mechanism that scrolls through said viewable object at a rate dependent upon said inertia of said slider, a direction of said force, and a duration of said force associated with said dragging of said inertial slider such that an initially at rest slider tends to remain at rest until acted upon by said force, and tends to accelerate dependent upon said direction and duration of said force and said slider inertia, with said inertial response mechanism that scrolls through said viewable object responsive to dragging of said inertial slider.

23. The program product of claim 22 further comprising:

a reversal of direction mechanism that arrests the motion of said slider and subsequently scrolls through said viewable object in a reversed direction and at a rate dependent upon said inertia of said slider, a direction of said force, and a duration of said force associated with said dragging of said inertial slider such that said arrested slider tends to remain at rest until acted upon by said force, and then tends to accelerate dependent upon the direction and duration of said force and said slider inertia, with said reversal of direction mechanism that arrests the motion of said slider responsive to a reversal of direction of said dragging of said inertial slider.

* * * * *